US 6,594,308 B1

(12) United States Patent
Galbiati et al.

(10) Patent No.: US 6,594,308 B1
(45) Date of Patent: Jul. 15, 2003

(54) CONVERSION OF A NUMERIC COMMAND VALUE IN A CONSTANT FREQUENCY PWM DRIVE SIGNAL FOR AN ELECTROMAGNETIC LOAD

(75) Inventors: Ezio Galbiati, Agnadello (IT); Lorenzo Papillo, Milan (IT); Francesco Chrappan Soldavini, Bresso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/451,459

(22) Filed: Nov. 30, 1999

(30) Foreign Application Priority Data

Dec. 23, 1998 (EP) .............................. 98830775

(51) Int. Cl.$^7$ ................................ H03K 9/08
(52) U.S. Cl. ....................... 375/238; 332/109
(58) Field of Search ................ 375/238; 341/145; 332/109; 318/139, 599; 700/13

(56) References Cited

U.S. PATENT DOCUMENTS

| 4,233,591 A | 11/1980 | Murata et al. ........ 340/347 DA |
| 4,590,457 A | 5/1986 | Amir ................ 340/347 DA |
| 6,310,912 B1 * | 10/2001 | Maiocchi et al. .......... 375/238 |

FOREIGN PATENT DOCUMENTS

| EP | 0 892 500 A1 | 1/1999 | ........ H03M/1/5387 |
| EP | 0 897 213 A1 | 2/1999 | ........ H02M/7/5387 |

* cited by examiner

Primary Examiner—Stephen Chin
Assistant Examiner—Curtis Odom
(74) Attorney, Agent, or Firm—Lisa K. Jorgenson; Allen, Dyer, Doppelt, Milbrath & Gilchrist, P.A.

(57) ABSTRACT

A method is provided for driving a load in a pulse width modulation (PWM) mode as a function of numeric command values having a predetermined number of N-bits. The method includes the step of incrementing by more than a unit the number of bits on which a selected command value is mapped, wherein a unit equals N-bits plus a plurality of additional bits. The N most significant bits of the selected command value are converted. The plurality of additional bits are decoded by generating a corresponding plurality of intermediate levels of variation in the duty cycle. Each intermediate level has a duration of half a clock period and produces a plurality of signals out of phase among each other by half a clock period. A driving PWM signal is generated by multiplexing the signals out of phase among each other by half a clock period, and carrying out logic combinations of these signals as a function of a most significant bit of the selected command value and as a function of the plurality of additional bits.

18 Claims, 6 Drawing Sheets

| MSB | Bit2 | Bit1 | Bit0 | IN_A | IN_B |
|---|---|---|---|---|---|
| 0 | 0 | 0 | 0 | C | *C |
| 0 | 0 | 0 | 1 | C | *C |
| 0 | 0 | 1 | 0 | C and D | *C or *D |
| 0 | 0 | 1 | 1 | C and D | *C or *D |
| 0 | 1 | 0 | 0 | B and D | *B or *D |
| 0 | 1 | 0 | 1 | B and D | *B or *D |
| 0 | 1 | 1 | 0 | B and E | *B or *E |
| 0 | 1 | 1 | 1 | B and E | *B or *E |
| 1 | 0 | 0 | 0 | A and E | *C |
| 1 | 0 | 0 | 1 | C | *C |
| 1 | 0 | 1 | 0 | C or D | *C and *D |
| 1 | 0 | 1 | 1 | C or D | *C and *D |
| 1 | 1 | 0 | 0 | B or D | *B and *D |
| 1 | 1 | 0 | 1 | B or D | *B and *D |
| 1 | 1 | 1 | 0 | B or E | *B and *E |
| 1 | 1 | 1 | 1 | B or E | *A and *E |

CONVERSION OF A NUMERIC COMMAND VALUE IN A CONSTANT FREQUENCY PWM DRIVE SIGNAL FOR AN ELECTROMAGNETIC LOAD

FIELD OF THE INVENTION

The present invention relates to electronics, and, more particularly, to a driving technique through an output power bridge for an electromagnetic R-L actuator.

BACKGROUND OF THE INVENTION

An example of a conversion system for an N-bit digital value in a pulse width modulation (PWM) signal is disclosed in European Patent Application No. 96,830,295 filed on May 22, 1996, which is assigned to the assignee of the present invention. The disclosed conversion system sets N equal to eight.

Numeric values from sampling (digitizing) a suitably optimized driving waveform may be read from one or more nonvolatile memory buffers, and multiplied by a modulating variable whose magnitude is determined by the control system. The magnitude is dependent upon the force, torque or speed required by the electromagnetic actuator. The resulting numeric value is written in a register. A certain pre-established number (N) of most significant bits resulting from the multiplication are thereafter used as the driving numeric value.

Such a conversion system is shown in FIG. 1, and is based upon comparing the input BYTE (N=8) with the status of an 8-bit timer functioning in a continuous up/down mode. The input BYTE represents the sample value to be converted. In FIGS. 1 and 2, the BYTE (N=8) input sample is synchronously loaded into the SL register to avoid a sample updating during the conversion. The comparator COMP generates a clock pulse for the latch FF2 each time the counter CNT equals the value of the sample to be converted. The output is a PWMOUT signal having a duty cycle that varies proportionally with the input value, and symmetrically with respect to the maximum count value of the counter.

As shown in FIG. 2, the unit increment of the input sample value to be converted determines a double and symmetric decrement of the output duty cycle. The unit increment is highlighted in the figure. In FIG. 2, the transition from the value 188 to the value 189 determines the duty cycle variation, as represented by a dashed-line.

When driving an output bridge stage, the current is controlled in a pulse shift modulation (PSM) mode according to a technique that is commonly implemented in these types of power drivers. A description of which may be found in European Patent No. EP 0760552, granted Mar. 3, 1997, which is assigned to the assignee of the present invention. In the disclosed technique, two values must be converted, one for each output half bridge having a value symmetrical to $2^N$.

In these applications, a unit increment of the value forced in a half bridge corresponds to a unit decrement of the value forced in the other half bridge to maintain the above cited symmetry. This implies a double differential increment of the duty cycle.

SUMMARY OF THE INVENTION

An object of the invention is to avoid the above described duty cycle variations for unit value variations for input samples of a bridge driving system.

A pulse width modulation (PWM) driving technique for an output bridge stage controls the voltage applied to the actuator to determine the current that actually flows through it. The PWM control signal is generated by a circuit that converts an N-bit digital value into a digital signal having an amplitude compatible with the input characteristics of the output stage. The output signal has a fixed frequency and a duty cycle proportional to the input value.

The method of the present invention separately handles the four instants of comparison between the input data and the output of the up/down counter. This is while ensuring that the minimum variation of the duty cycle is substantially halved by using the half clock period of the system. This allows seven intermediate levels of duty cycle variations to be obtained between any two consecutive values of the input data having eight bits.

According to another aspect of the invention, an increment of the conversion process is achieved by increasing a certain number of bits, e.g., N to N+3, the size of the driving numeric value to be converted without increasing the number of bits of the up/down counter in which the comparison is carried out. The size of the driving numeric value commonly results from the product of a sampled value with a modulating value.

BRIEF DESCRIPTION OF THE DRAWINGS

FIGS. 3b, 3c and 3d respectively show driving signals for the output stage illustrated in FIG. 3a.

FIG. 8 shows a truth table of the MULTIPLEXER block illustrated in FIG. 6.

DETAILED DESCRIPTION OF THE PREFERRED EMBODIMENTS

An embodiment of the present invention described below is illustrated with reference to FIGS. 4–8. The illustrated embodiment refers to the driving of an R-L load through an output bridge stage that requires generation of a dual pair of PWM driving signals IN_A, IN_B as a function of a certain numeric command value DATAIN. The present invention is also useful for a driving stage requiring generation of a single PWM signal.

FIGS. 3a, 3b, 3c and 3d illustrate a PWM driving system for a generic R-L actuator through a bridge stage in accordance with a Phase Shift Modulation (PSM) mode. The two signals IN1 and IN2 are obtained by converting a digital command datum DATAIN mapped on N+3 bits into two PWM signals. In the following description, VAL refers to the N most significant bits (MSB) of DATAIN, and *VAL+1 is the complementary value of VAL with respect to $2^N/2$. Moreover, for illustrative purposes, reference will be made to a system where N=8. However, N may be a value other than eight. The null current condition through the load occurs when the two input signals IN1 and IN2 are in phase with each other and both have a 50% duty cycle. This corresponds to the BYTE/PWM converter having two input values VAL and *VAL+1 having a magnitude equivalent to the decimal value 128, or $2^N/2$ for a generic number of N bits.

Figure 1:
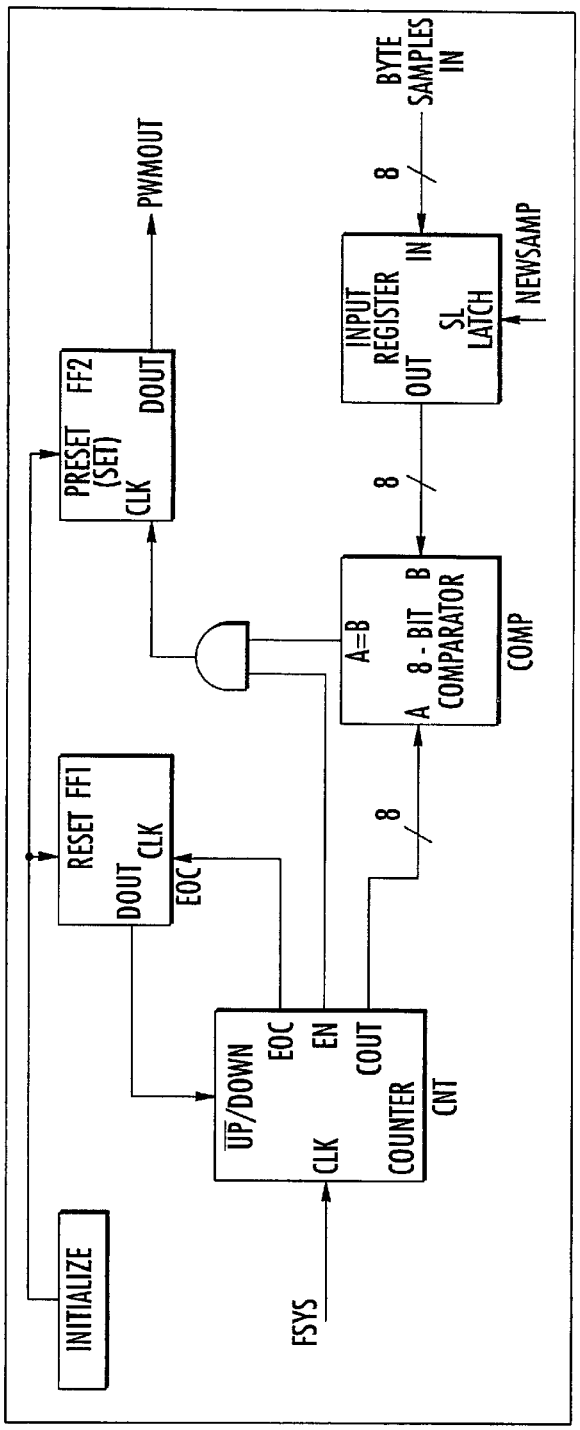
FIG. 1 is a block diagram of a BYTE/PWM (N=8) converter according to the prior art.
Figure 2:
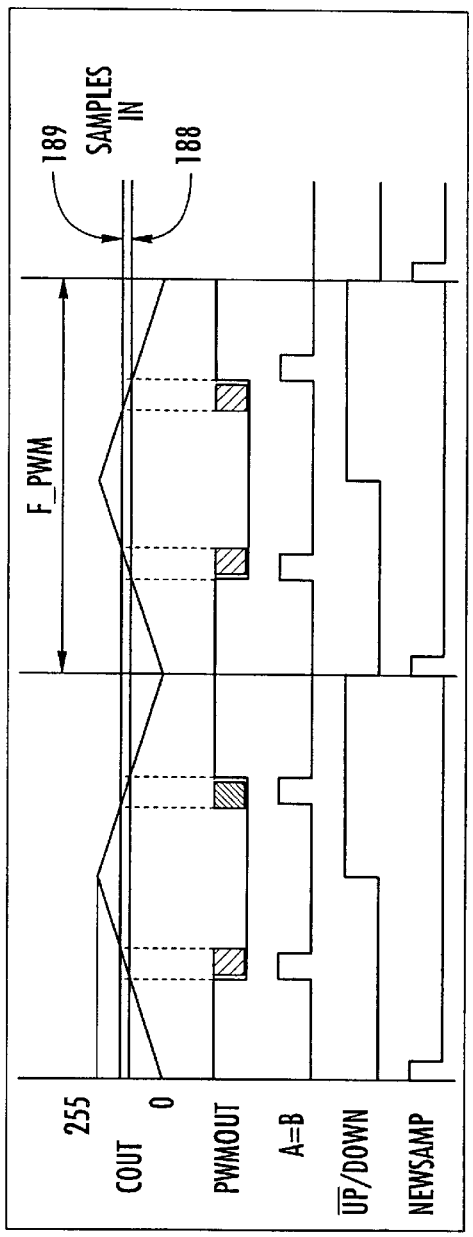
FIG. 2 shows the signals generated by the BYTE/PWM converter illustrated in FIG. 1.
Figure 3A:
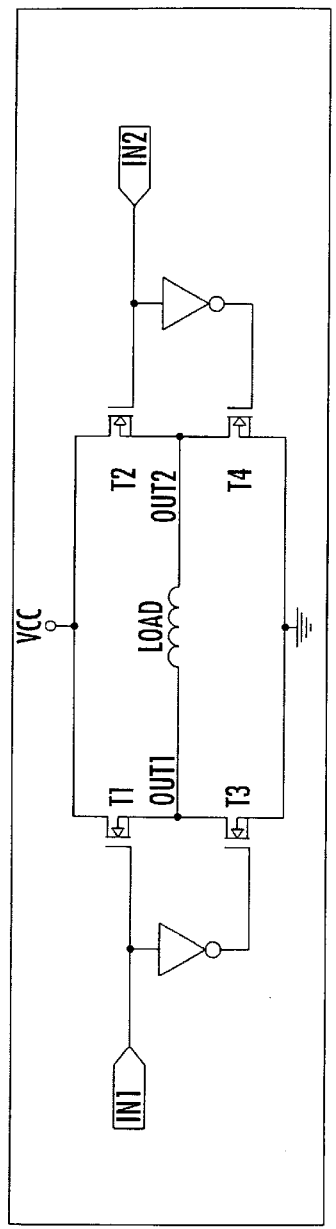
FIG. 3a is a detailed schematic of an output stage driven by signals originating from an NBITS/PWM converter in accordance with the present invention.
Figure 3B:
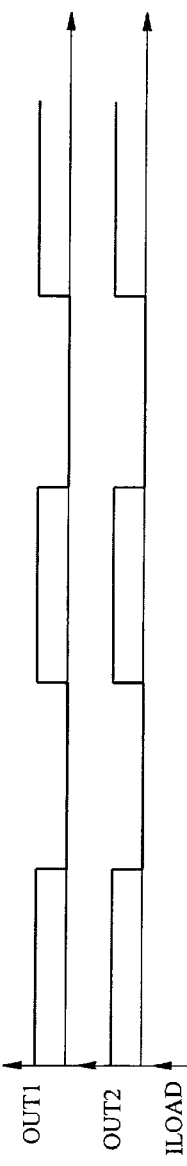
Figure 3C:
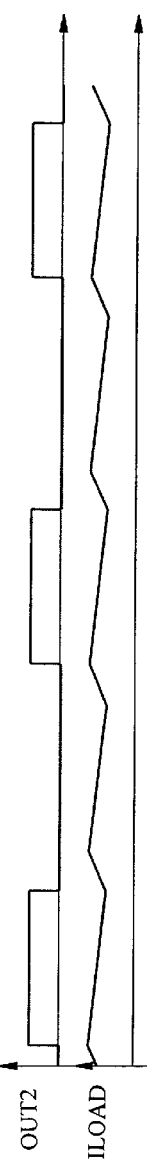
Figure 3D:
Figure 4:
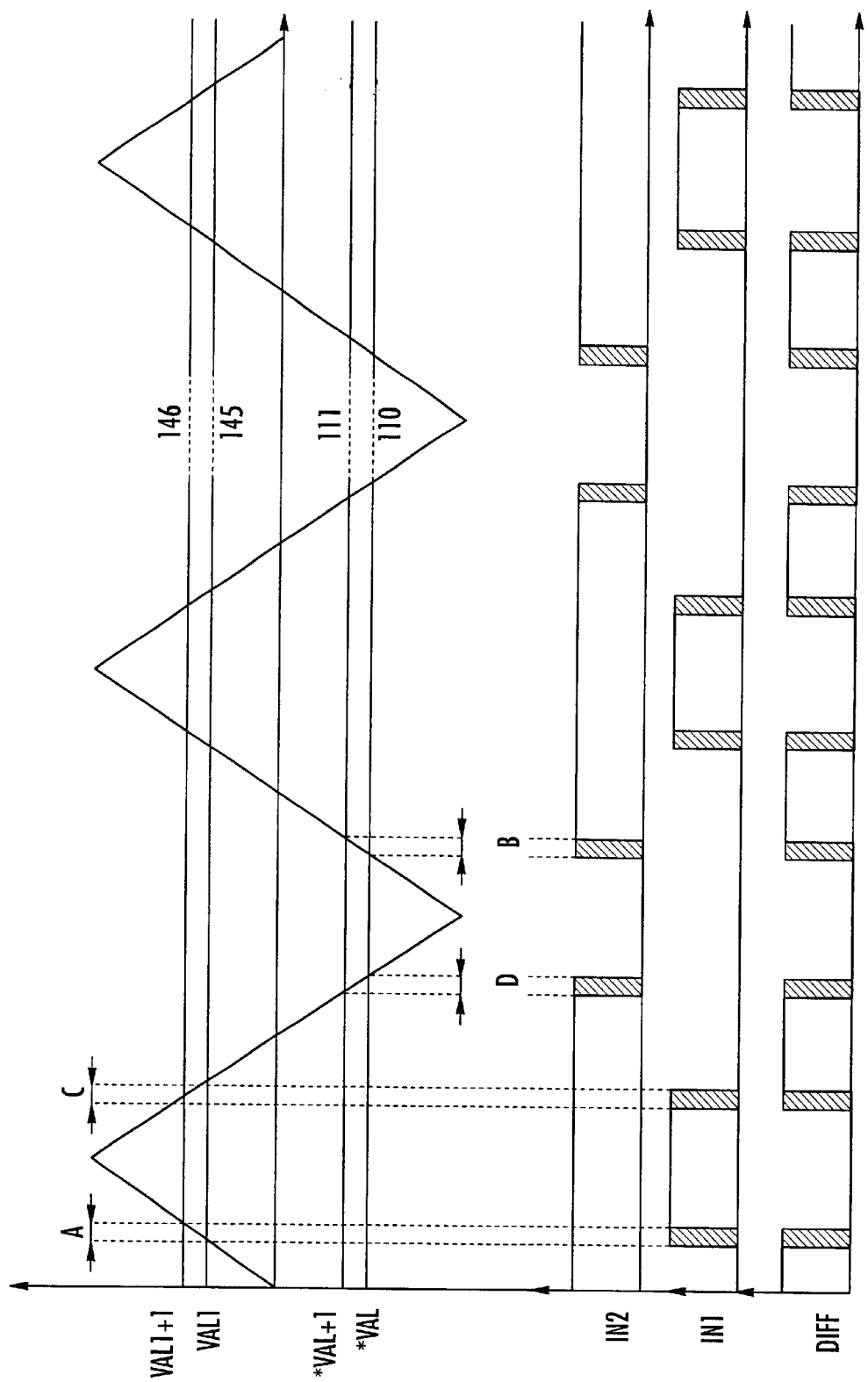
FIG. 4 is a timing diagram highlighting the duty cycle variations determined by a unit variation of the digital value being converted in a PWM signal in accordance with the present invention.

As graphically shown in FIG. 4, there are four instants of comparison among the VAL, *VAL+1 values and the current value of the counter in a complete up/down counter period. In the example of FIG. 4, the VAL value varies from 145 to 146 and, correspondingly, the value of *VAL+1 is symmetric with respect to 128 and is decreased from 111 to 110. Respectively, this corresponds to an A+C decrement of the duty cycle of the IN1 signal and to a B+D duty cycle increment of the IN2 signal. The differential duty cycle DIFF is therefore increased by A+B+C+D for a unit increment/decrement of VAL and *VAL+1. With respect to time, the A, B, C and D instants are equal to a period of the clock SysClk. This means that the differential variation of the duty cycle equivalent to A+B+C+D has a duration of four pulses of the clock SysClk.

Fundamentally, the method of the present invention separately handles the four instants of comparison between the input datum and the output of the up/down counter. This ensures that the duty cycle variation with respect to time is substantially halved by using the half clock period of the system. This allows seven intermediate levels of duty cycle variations to be established between any two numerically consecutive values of the 8-bit input datum. To obtain the intermediate levels of duty cycle variations, the input datum must be incremented to N+3 bits. The N-bits are converted normally by the BYTE/PWM converter, while the three additional bits are decoded to obtain the seven intermediate levels of duty cycle variations having a duration of half the clock period.

Figure 5:
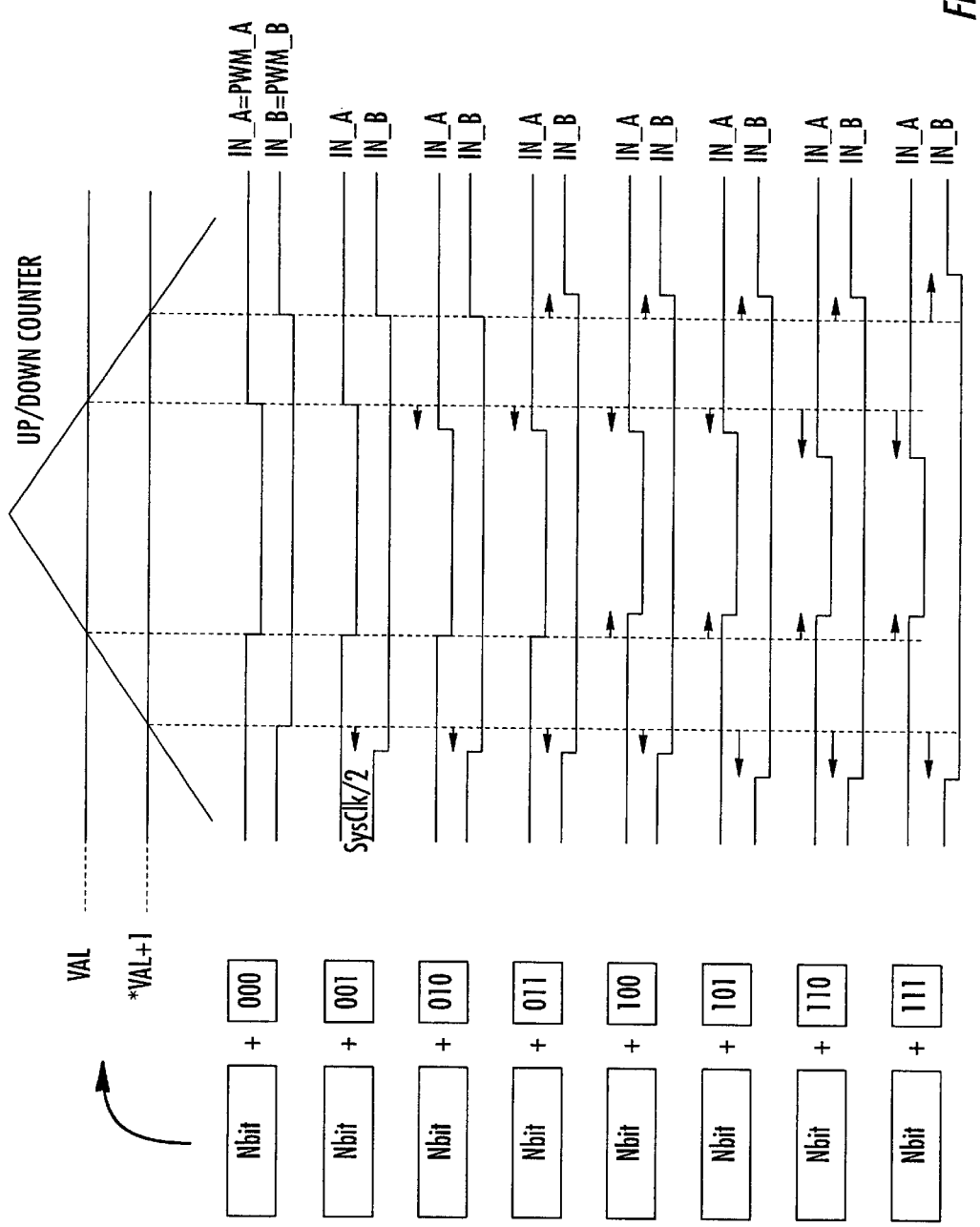
FIG. 5 is a timing diagram of a conversion system in accordance with the present invention.
Figure 6:
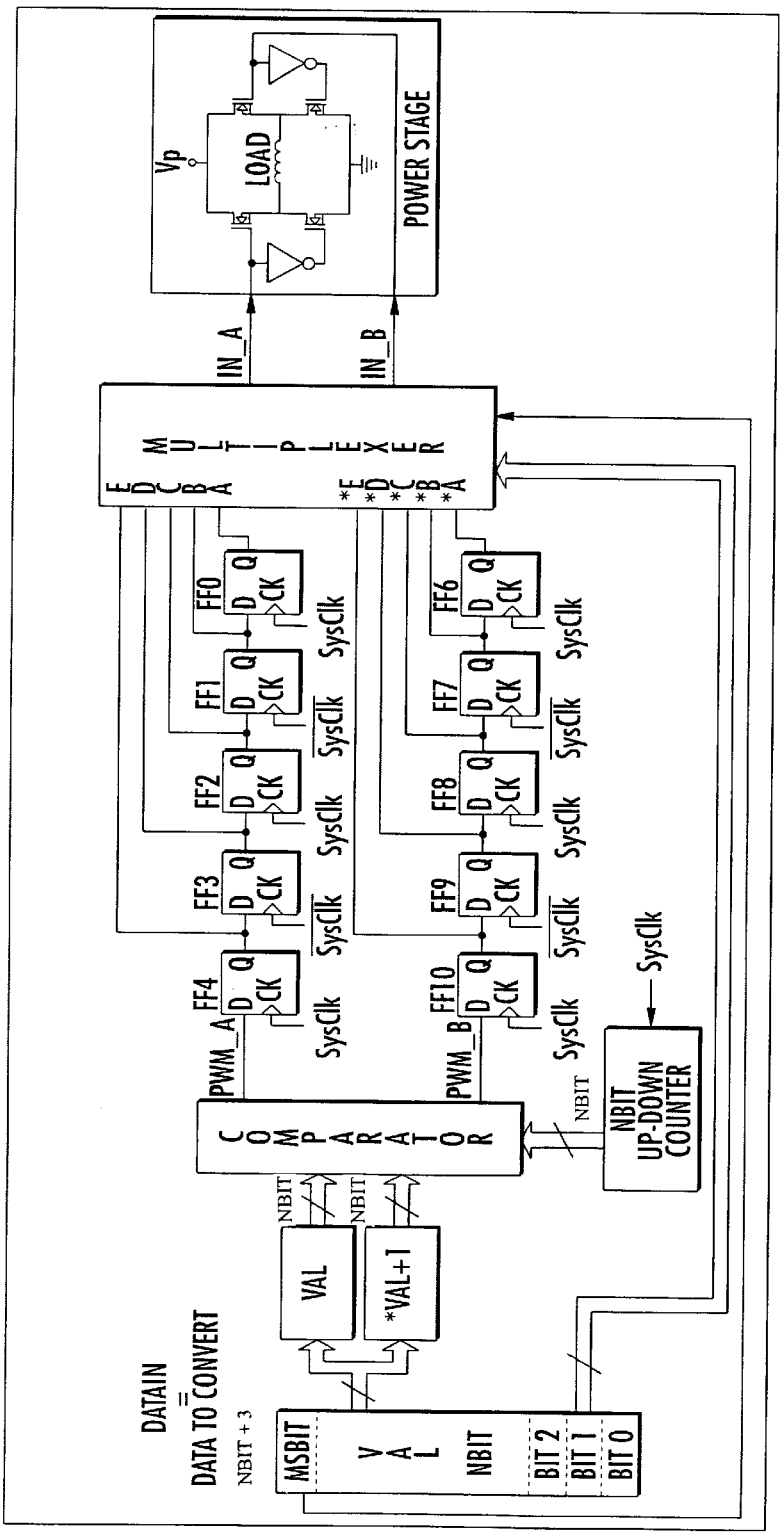
FIG. 6 is a block diagram of a conversion system in accordance with the present invention.

The timing diagram of FIG. 5 shows the relation between the duty cycle variations obtained at the outputs PWM_A, PWM_B of the BYTE/PWM converter of FIG. 6. This is dependent upon the decoding of the three least significant bits that are added to the N-bits input. If the three least significant bits are equal to 000, the operation is not effected. If the value is 001, the leading edge of the negative PWM_B signal is shifted by half a period of the clock. If the value is 010, the leading edge of the positive PWM_A signal is shifted by half a period of the clock, as illustrated in FIG. 5.

Therefore, the system of the invention provides for the conversion of a numeric command datum in a PWM signal having a duty cycle definition greater than the number of bits of the up/down counter, wherein the number of bits of the up/down counter remain unchanged. More precisely, if N is the number of bits of the up/down counter, the system of the invention allows for the conversion of an input datum mapped on N+3 bits.

FIG. 6 shows a block diagram of a system in accordance to the present invention. The DATAIN datum to be converted in a PWM signal includes a word having N+3 bits, with N=8, for example. The most significant N-bits are stored in two registers VAL, *VAL+1, and are compared with the contents of the up/down counter to respectively obtain two PWM signals PWM_A and PWM_B. This is done according to the technique described in the above referenced European Patent Application No. 96,830,295.

According to the present invention, the pair of signals thus generated are sent to a respective cascade of flip-flops. Referring to the block diagram of FIG. 6, the PWM_A output is coupled to the input of the flip-flop FF4, whose output is fed to the input of the flip-flop FF3 and so forth to flip-flop FF0. The PWM_B output is coupled to the input of the flip-flop FF10 whose output is fed to the input of flip-flop FF9 and so forth to flip-flop FF6.

The even order flip-flops receive a clock signal SysClk, while the inverted clock signal *SysClk is fed to the odd order flip-flops. Therefore, the five E, D, C, B, A signals produced are offset in phase with each other by half a clock period. These five signals have a frequency and duty cycle equal to the PWM_A signal. The same applies for the PWM_B signal, whereby the five signals generated are identified as *E, *D, *C, *B and *A.

Figure 7:
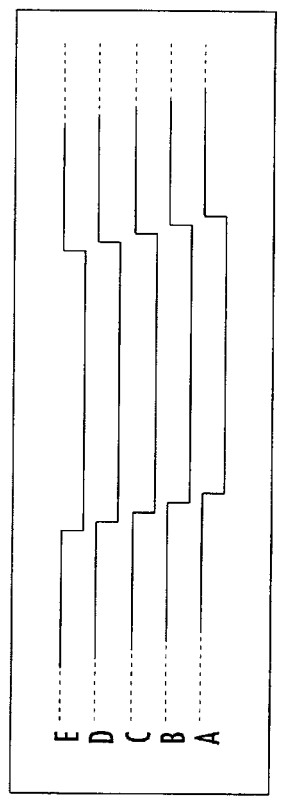
FIG. 7 shows the phase relationship among the output signals from the cascade of flip-flops illustrated in FIG. 6 responsive to a PWM_A input signal.

FIG. 7 illustrates the signals thus obtained. By processing these signals, it is possible to shift the rising edge or the falling edge by a minimum time interval equivalent to half a clock period. This increments resolution of the PWM signal compared to what occurred in known systems. This is made possible by using the three least significant bits of the input data to be converted. The value of the three least significant bits are decoded for starting logic sum and multiplication operations among the five generated signals that permit duty cycle variations eight times smaller than those that were obtainable with known systems. This is advantageously done while the number of bits of the up/down counter remains unchanged.

The following Table 1 indicates how the three least three significant bits are used for identifying seven intermediate levels between two numerically consecutive values representable with an N-bit numeric command value.

TABLE 1

| 8 msb | bit 2 | bit 1 | bit 0 | effective value |
|-------|-------|-------|-------|-----------------|
| 175   | 0     | 0     | 0     | 175.000         |
| 175   | 0     | 0     | 1     | 175.125         |
| 175   | 0     | 1     | 0     | 175.250         |
| 175   | 0     | 1     | 1     | 175.375         |
| 175   | 1     | 0     | 0     | 175.500         |
| 175   | 1     | 0     | 1     | 175.625         |
| 175   | 1     | 1     | 0     | 175.750         |
| 175   | 1     | 1     | 1     | 175.875         |
| 176   | 0     | 0     | 0     | 176.000         |

The MULTIPLEXER block shown in FIG. 6 receives as inputs the five signals generated by the cascade of flip-flops fed with the PWM_A signal, and the five signals generated by the cascade of flip-flops fed with the PWM_B signal. Moreover, the MULTIPLEXER block receives the three least significant bits of the input datum to be converted, plus the most significant bit MSBit. The most significant bit MSBit indicates whether the value of VAL of the input datum DATAIN is greater or smaller than 128 (for N=8).

The MULTIPLEXER block increments the resolution of the duty cycle of the PWM_A and PWM_B signals generated by the COMPARATOR. The two IN_A and IN_B signals are generated having a higher resolution as a function of the values of the three least significant bits of the input datum. The truth table of FIG. 8 indicates the logic operations performed by the MULTIPLEXER block as a function of decoding the three least significant bits of the input datum.

For example, for conversion of VAL having a value equal to 190.625, the 8 most significant bits of DATAIN is the integer part which in binary form is 10111110. The three least significant bits representing the fractional part in binary form is equal to 101. The eight most significant bits (VAL) are then compared with the content of the up/down counter and transformed into the two signals PWM_A and PWM_B.

The MULTIPLEXER block decodes the three least significant bits, wherein the VAL datum is greater than 128. The MULTIPLEXER block implements the logic operations among the five output signals of the cascade of flip-flops fed with the PWM_A signal, and the five output signals of the cascade of flip-flops fed with the PWM_B signal. The MULTIPLEXER block outputs the IN_A and IN_B signals. These signals have a duty cycle modified to add the fractional part to the signals PWM_A and PWM_B.

That which is claimed is:

1. A method for driving a load in a pulse width modulation (PWM) mode as a function of numeric command values having an N number of bits, the method comprising the steps of:
    incrementing by a plurality of additional bits the number of N-bits on which a selected numeric command value is mapped, the selected numeric command value being in a PWM signal having a fixed frequency and a duty cycle proportional to the selected numeric command value;
    converting the N-bits of the selected command value by comparing the N-bits of the selected numeric command value with N-bits from an up/down counter functioning in a continuous mode at a frequency of a system clock signal, the N-bits being the most significant bits;
    decoding the plurality of additional bits by generating a corresponding plurality of intermediate levels of variation in the duty cycle by using at least one cascade of flip-flops having an input receiving the PWM signal, each intermediate level having a duration of half a clock period for producing a plurality of signals out of phase among each other by half a clock period, the plurality of additional bits being the least significant bits; and
    generating at least one driving PWM signal by multiplexing the signals out of phase among each other, and carrying out logic combinations of these signals as a function of a most significant bit of the selected numeric command value and as a function of the plurality of additional bits.

2. The method according to claim 1, further comprising the step of driving the load through an output bridge stage using the at least one driving PWM signal.

3. The method according to claim 1, wherein the step of generating at least one driving PWM signal comprises generating a complementary pair of driving PWM signals.

4. The method according to claim 3, wherein generating the complementary pair of driving PWM signals comprises the steps of:
    storing in a first register the N-bits of the selected command value;
    storing in a second register the same N-bits so that a unit increment in contents of the first register corresponds a unit decrement in contents of the second register to maintain symmetry with respect to the value $2^N/2$ corresponding to a null current through the load; and
    duplicating in parallel the steps of converting, decoding and generating for the respective contents of the first and second registers.

5. The method according to claim 1, wherein the step of converting is performed using a comparator.

6. A method for driving a load in a pulse width modulation (PWM) mode as a function of numeric command values having a predetermined number of N-bits, the method comprising the steps of:
    incrementing by a plurality of additional bits the number of N-bits on which a selected numeric command value is mapped, the selected numeric command value being in a PWM signal;
    converting the N-bits of the selected command value by comparing the N-bits of the selected numeric command value with N-bits from an up/down counter functioning in a continuous mode at a frequency of a system clock signal;
    decoding the plurality of additional bits by generating a corresponding plurality of intermediate levels of variation in the duty cycle by using at least one cascade of flip flops having an input receiving the PWM signal, each intermediate level having a duration of half a clock period for producing a plurality of signals out of phase among each other by half a clock period; and
    generating at least one driving PWM signal using the signals out of phase among each other and carrying out logic combinations of these signals as a function of the incremented selected numeric command value.

7. The method according to claim 6, wherein the step of generating is performed by multiplexing the signals out of phase among each other with the logic combinations of these signals.

8. The method according to claim 6, wherein the step of carrying out logic combinations as a function of the incremented selected numeric command value is performed on a most significant bit of the selected numeric command value and as a function of the plurality of additional bits.

9. The method according to claim 6, further comprising the step of driving the load through an output bridge stage using the at least one driving PWM signal.

10. The method according to claim 6, wherein the step of generating at least one driving PWM signal comprises generating a complementary pair of driving PWM signals.

11. The method according to claim 10, wherein the step of generating the complementary pair of driving PWM signals comprises the steps of:
    storing in a first register the N-bits of the selected command value;
    storing in a second register the same N-bits so that a unit increment in contents of the first register corresponds a unit decrement in contents of the second register to maintain symmetry with respect to the value $2^N/2$ corresponding to a null current through the load; and
    duplicating in parallel the steps of converting, decoding and generating for the respective contents of the first and second registers.

12. The method according to claim 6, wherein the step of converting is performed using a comparator.

13. A conversion system comprising:
    a register for an input numeric command value having an N number of bits in a pulse width modulation (PWM) signal having a fixed frequency and a duty cycle proportional to the input numeric command value, the N number of bits comprising N-bits plus a plurality of additional bits;
    an up/down counter having N-bits and functioning in a continuous mode at a frequency of a system clock signal;
    a comparator connected to said register and to said up/down counter comparing the N-bits of the input numeric command value with the N-bits of said up/down counter;

at least one cascade of flip-flops connected to said comparator and having respective inputs receiving the PWM signal, even numbered flip flops having respective inputs receiving the system clock signal, and odd numbered flip-flops having respective inputs with an inverted system clock signal; and a multiplexer connected to outputs of said cascade of flip-flops for performing a logic combination on received signals as a function of a most significant bit of the input numeric command value and as a function of the plurality of additional bits, and outputting at least one PWM driving signal.

14. The conversion system according to claim 13, further comprising an output bridge stage connected to a load to be driven by the at least one PWM driving signal.

15. The conversion system according to claim 13, wherein the at least one PWM driving signal comprises a complementary pair of PWM signals, and said at least one cascade of flip-flops comprises a pair of cascade of flip flops in parallel.

16. The conversion system according to claim 15, wherein said register further comprises:

a first register connected to said register storing the N-bits of the input numeric command value; and a second register connected to said register storing the same N-bits so that a unit increment in contents of said first register corresponds a unit decrement in contents of said second register to maintain symmetry with respect to the value $2^N/2$ corresponding to a null current through the load.

17. A conversion system comprising:

a register for an input numeric command value having an N number of bits in a pulse width modulation (PWM) signal having a fixed frequency and a duty cycle proportional to the input numeric command value, the N number of bits comprising N-bits plus a plurality of additional bits;

a first register connected to said register storing the N-bits of the input numeric command value;

a second register connected to said register storing the same N-bits so that a unit increment in contents of said first register corresponds a unit decrement in contents of said second register to maintain symmetry with respect to the value $2^N/2$ corresponding to a null current through the load;

an up/down counter having N-bits and functioning in a continuous mode at a frequency of a system clock signal;

a comparator connected to said first and second registers and to said up/down counter for comparing the N-bits of the input numeric command value with the N-bits of said up/down counter;

a pair of parallel cascade of flip-flops connected to said comparator and having respective inputs receiving the PWM signal, even numbered flip flops having respective inputs receiving the system clock signal, and odd numbered flip-flops having respective inputs with an inverted system clock signal; and a multiplexer connected to outputs of said pair of parallel cascade of flip-flops for performing a logic combination on received signals as a function of a most significative bit of the input numeric command value and as a function of the plurality of additional bits, and outputting a complementary pair of PWM driving signals.

18. The conversion system according to claim 17, further comprising an output bridge stage connected to a load to be driven by the complementary pair of PWM driving signals.

* * * * *